United States Patent [19]

Bueler et al.

[11] 4,145,091
[45] Mar. 20, 1979

[54] DUAL RELAY CONTROL VALVE HAVING INTEGRAL SOLENOID VALVE

[75] Inventors: Richard C. Bueler, Des Peres; Dennis M. McWilliams, Florissant, both of Mo.

[73] Assignee: Wagner Electric Corporation, St. Louis, Mo.

[21] Appl. No.: 838,371

[22] Filed: Sep. 30, 1977

[51] Int. Cl.² .................. B60T 13/68; B60T 15/12; B60T 15/18
[52] U.S. Cl. ........................................ 303/118; 303/7; 303/40; 303/52
[58] Field of Search .............. 137/492.5, 627.5, 513.5; 303/7, 9, 13, 28–29, 40, 52, 113, 115, 118, 106

[56] References Cited

U.S. PATENT DOCUMENTS

| 3,138,410 | 6/1964 | Bueler | 303/52 |
|---|---|---|---|
| 3,138,411 | 6/1964 | Bueler | 303/52 |
| 3,183,042 | 5/1965 | Bueler | 303/52 |
| 3,207,561 | 9/1965 | Bueler | 303/52 |
| 3,265,447 | 8/1966 | Bueler | 303/52 |
| 3,269,784 | 8/1966 | Bueler | 303/52 |
| 3,279,867 | 10/1966 | Bueler | 303/52 |
| 3,291,539 | 12/1966 | Bueler | 303/52 |
| 3,450,154 | 6/1969 | Bueler | 303/52 X |
| 3,827,760 | 8/1974 | Fleagle | 303/106 |
| 3,881,779 | 5/1975 | Machek | 303/118 |
| 3,992,064 | 11/1976 | Carton et al. | 303/29 X |
| 4,042,281 | 8/1977 | Ury | 303/29 |

Primary Examiner—Stephen G. Kunin
Attorney, Agent, or Firm—Eyre, Mann, Lucas & Just

[57] ABSTRACT

A dual relay valve for controlling the supply of fluid pressure to two sets of brakes is operated by a single source of control fluid pressure. A solenoid-operated valve, controlled by a skid-control logic circuit isolates and vents the control fluid pressure upon detection of skid conditions.

6 Claims, 5 Drawing Figures

DUAL RELAY CONTROL VALVE HAVING INTEGRAL SOLENOID VALVE

BACKGROUND OF THE INVENTION

Heavy duty braking systems, for example those on heavy vehicles and industrial equipment use a high-pressure source of braking fluid selectively applied to the brakes under manual control of the vehicle or equipment operator. To ease the manual burden of controlling the application of fluid pressure from a high-pressure source, and to provide more precise control, it has been conventional to interpose a relay control valve in the path between the high pressure fluid source and the brakes. The operator is conventionally provided with a treadle or hand controller which receives high-pressure fluid at its input and provides fluid at its output having a pressure related to the amount of treadle or hand controller motion. The fluid pressure output of the treadle or hand controller is called the control fluid pressure. The control fluid pressure is connected to a control inlet of the relay control valve. The relay control valve responds to changes in control fluid pressure by valving fluid pressure into, or exhausting fluid pressure from, the brakes. In this way, a small volume of control fluid under the control of the operator controls the application and exhaustion of relatively large volumes of brake fluid to and from the brakes. On relay control valve is customarily used to provide brake fluid pressure to a left-right set of wheels or to the four or more sets of wheels on a truck bogie.

Recent advances in wheel slip control systems have brought forth electrical solenoid-controlled modulator valves which momentarily interrupt the application of brake fluid pressure to the brakes when an electronic circuit detects conditions related to a skid and later reapply the brake fluid pressure to the brakes. In U.S. Pat. No. 3,752,536 to John Machek, a solenoid-controlled modulator valve directly interrupts the communication of brake fluid pressure to the brakes. In a number of other prior art systems, such as shown in U.S. Pat. Nos. 3,881,779; 3,854,501 and 3,758,167, a solenoid controlled modulator valve is interposed in the path of the control fluid from the treadle or hand controller to the relay control valve. By cutting off and venting a small volume of control fluid pressure, these systems are capable of relieving and reapplying the much greater volume of brake fluid pressure.

A dual relay control valve is shown in U.S. Pat. No. 3,450,154 in which a mechanical input, such as a treadle or hand control, applies a force through an actuation spring to one side of a control piston. The control piston is urged into a position which closes an exhaust port and opens a control valve which meters fluid pressure from a high-pressure source into a delivery chamber. The fluid pressure in the delivery chamber acts on the control piston in a direction which opposes the spring force. At a certain pressure in the delivery chamber, the force opposing the spring is enough to close the control valve and establish a fixed fluid pressure in the delivery chamber. Further mechanical input increases the fluid pressure in the delivery chamber. Reduced mechanical input proportionately exhausts it. The fluid pressure in the delivery chamber is admitted to a control chamber on one side of a second control piston. As the fluid pressure in the delivery chamber increases, the second control piston is urged into a position which closes a second exhaust port and meters proportionate fluid pressure into a second delivery chamber. In case of failure in the brake system connected to the first-mentioned delivery chamber a mechanical pushrod continues to actuate the second control piston even in the absence of fluid pressure in the first-mentioned delivery chamber.

U.S. Pat. No. 3,269,784 also teaches a dual relay control valve with manual input very similar to U.S. Pat. No. 3,450,154 except for the addition of a fluid-released spring safety actuation and an emergency manual air actuation.

A significant problem in wheel-slip control systems is the time delay between the initiation of an electrical control signal and the desired change in fluid pressure at the vehicle brakes. A part of this delay has been due to the time taken for an exhaustion of fluid pressure at a solenoid modulator valve to propagate through a pressure hose and become effective at the relay control valve.

SUMMARY OF THE INVENTION

The present invention feeds brake fluid pressure to two different sets of brakes from two semi-independent sources. Thus, for example the forward sets of wheels on a semi-trailer bogie is advantageously supplied from a source which is at least semi-independent of the source supplying the rear wheels. The invention is also advantageously usable to control the brakes on a tractor. Control fluid pressure is applied to one side of a first control piston which is urged toward a position closing a first exhaust passage and opening a first supply valve which admits a metered amount of brake fluid pressure from a first high pressure source into a first delivery chamber from whence it is admitted to the a first set of brakes. The fluid pressure in the first delivery chamber acts on the first control piston to oppose the force derived from the control fluid pressure. When the brake fluid pressure in the first delivery chamber is just sufficient to balance the control fluid pressure, the first supply valve is closed. Until there is a further change in the control fluid pressure the brake fluid pressure connected to the first set of brakes remains constant at the value established as described in the preceding. Further increases in control fluid pressure cause corresponding increases in brake fluid pressure to the first set of brakes by again opening the first supply valve until the increased brake fluid pressure in the first delivery chamber again balances the control fluid pressure. Decreases in control fluid pressure cause the first control piston to be retracted by the brake fluid pressure acting upon it until the first exhaust valve is opened to exhaust a metered amount of brake fluid pressure. When equilibrium is again attained at a brake fluid pressure greater than atmospheric, the first exhaust valve is closed to maintain the chosen value of brake fluid pressure.

A second control piston is similarly and simultaneously urged toward a position closing a second exhaust valve and opening a second supply valve which admits a substantially equal amount of brake fluid pressure from a second high pressure source into a second delivery chamber from whence it is admitted to a second set of brakes.

In one embodiment of the invention the second control piston normally uses the brake fluid pressure in the first delivery chamber as its source of control fluid pressure. If a failure in the first set of brakes holds the fluid pressure near atmospheric pressure in the first delivery chamber, a mechanical override system allows the second control piston to be directly driven by the first control piston. Thus, a failure in the first set of brakes will not cause the failure of the present invention to properly control the second set of brakes. A failure in the second set of brakes is also inoperative to cause failure to properly control the first set of brakes.

In a second embodiment of the invention, the control fluid pressure acts simultaneously on first and second control valves without the intermediate use of brake fluid pressure in a first delivery chamber acting as control fluid pressure on the second control piston. Each control valve in the second embodiment operates substantially as previously described. Failure in either the first or second set of brakes is inoperative to deny proper control of brake fluid pressure to the unfailed set of brakes.

In a variation on the first and second embodiments, an integral electrical solenoid modulator valve is adapted to momentarily cutting off and/or exhausting the control fluid pressure upon receiving electrical signals from a skid control logic circuit. This variation is desirable since it reduces the distance between the solenoid modulator valve and the relay control valve. Greater precision and rapidity of control is afforded by the virtual elimination of time delay between solenoid actuation and its effect on the relay control valve as well as a reduction in external plumbing with its potential for leaks and catastrophic failure.

DETAILED DESCRIPTION OF THE PREFERRED EMBODIMENT

Figure 1:
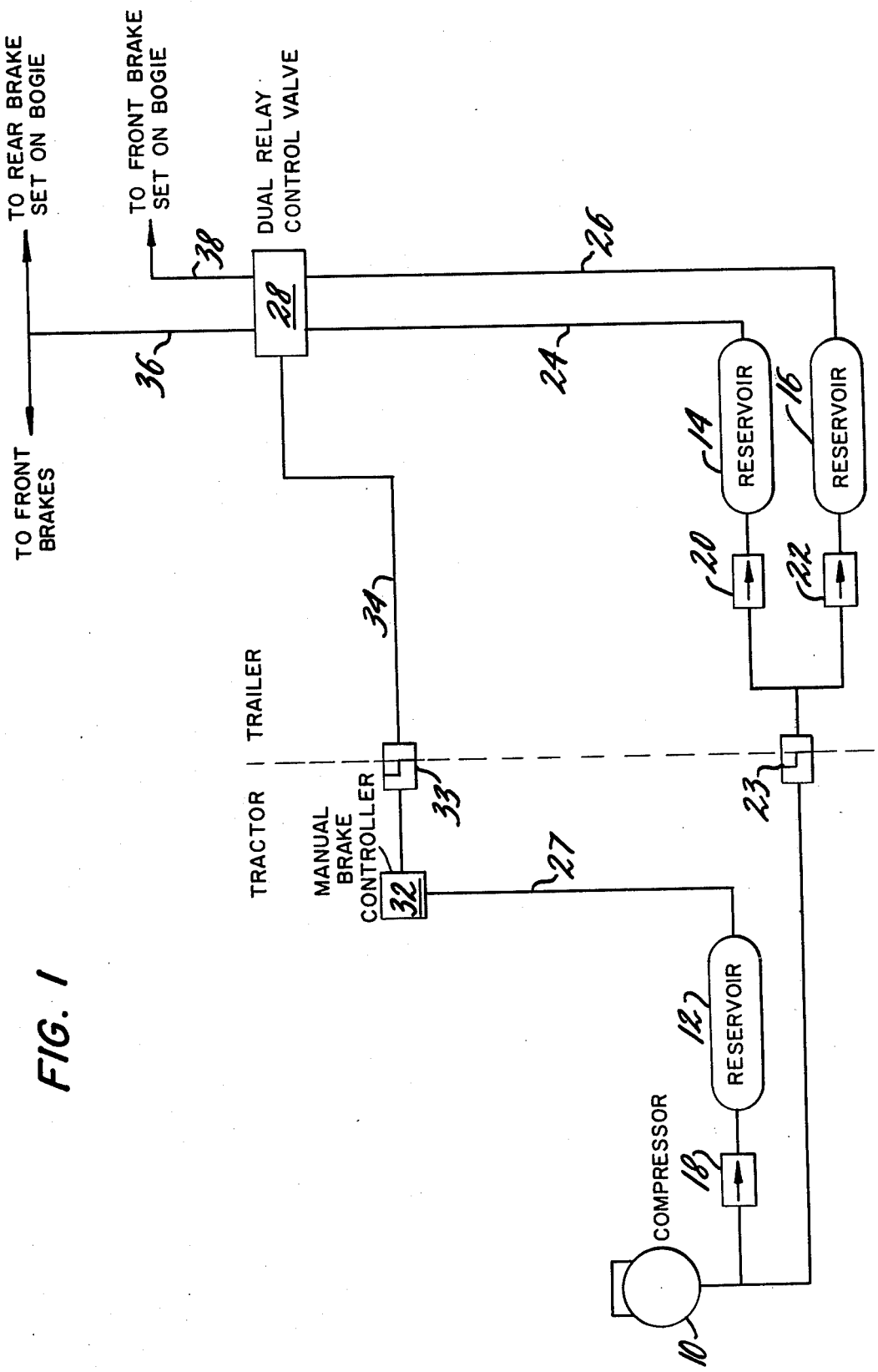
FIG. 1 shows a block diagram of the invention operatively connected into a brake system.

Referring to FIG. 1, a compressor 10 provides a supply of pressurized air in parallel to three reservoirs 12, 14, 16 through three check valves 18, 20, 22 respectively. The check valves 18, 20, 22 make all three reservoirs 12, 14, 16 protected, substantially constant-pressure sources in that, failure and complete depletion of any one reservoir is ineffective in itself to deplete the other two reservoirs. In a towed-vehicle installation, check valves 20 and 22 on the towed vehicle receive air pressure from the tractor through a glad-hand connector 23. The check valves 20 and 22 may be part of a valve portion as disclosed in U.S. Pat. No. 3,992,064 or they may be included as part of an integrated valve structure as disclosed in U.S. Pat. No. 4,042,281. Two of the reservoirs, 14 and 16, are connected via conduits 24 and 26 respectively to a dual relay control valve 28. The third reservoir 12 is connected via a conduit 27 to a manual brake controller 32. The manual brake controller 32 provides a control fluid pressure at its output which is proportional to the magnitude of its manual input, such as pedal depression or hand control lever rotation. Manual brake controllers suitable for use in the present system are well known in the art and do not comprise an inventive part of the present disclosure.

The output of the manual brake controller 32 is connected via glad hand connector 33 and conduit 34 to the dual relay control valve 28.

The dual relay control valve 28 meters a part of its input from conduit 24 to conduit 36. The fluid pressure connected to conduit 36 is proportional to the control fluid pressure in conduit 34. Similarly, the dual relay control valve 28 meters an approximately equal part of its input from conduit 26 to conduit 38.

FIG. 1 shows one of a number of optional destination combinations for the two fluid pressure outputs of the dual relay control valve 28. On a highway tractor having front wheel and fore-and-aft wheels on a bogie, for example, conduit 36 may be connected in parallel to the front wheels and the rear set of bogie wheels (not shown) while the conduit 38 may be connected to the front set of bogie wheels (not shown). Other arrangements are also desirable such as one output being shared between one or more axles of the tractor and one or more axles of a semi-trailer while the other output may be shared between the remaining axles of the tractor and semi-trailer.

DESCRIPTION OF THE FIRST EMBODIMENT

Figure 2:
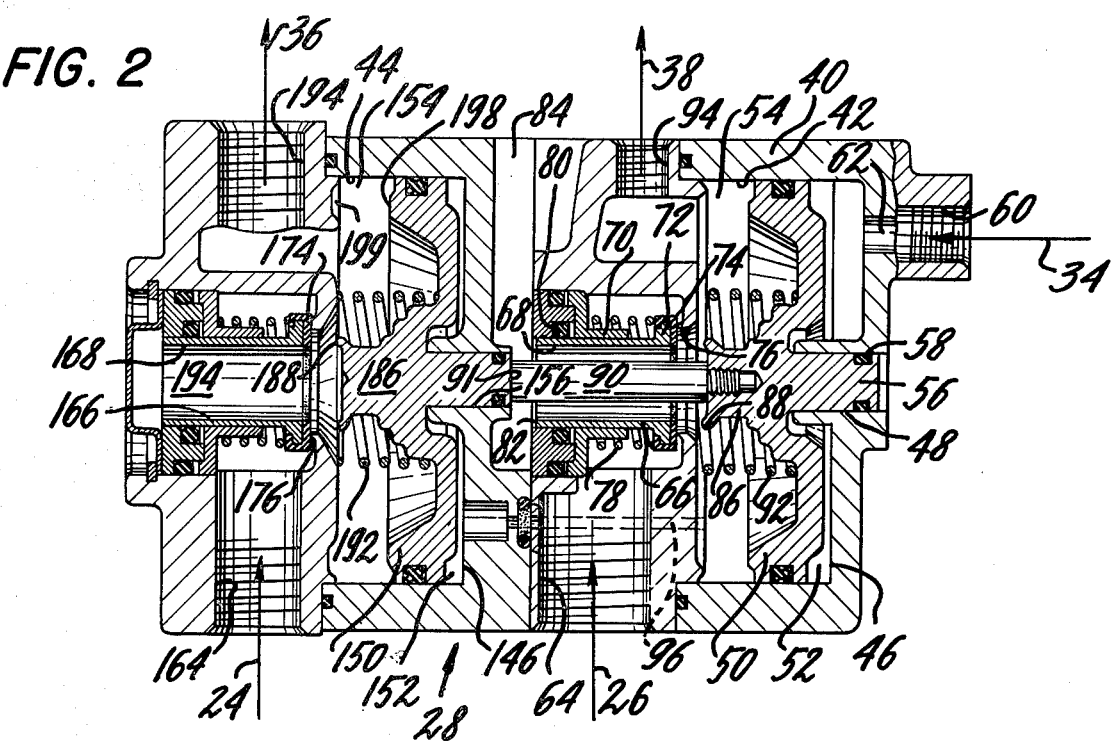
FIG. 2 shows a first embodiment of the invention in longitudinal cross section.

Referring now to FIG. 2, the dual relay control valve 28 has a body 40 having a first generally cylindrical chamber 42 and a second generally cylindrical chamber 44 therein. An end wall 46 closes one end of the first cylindrical chamber 42. A cylindrical port 48 is axially located in the end wall 46. A first control piston 50 is sealably fitted into the first cylindrical chamber 42 thus defining a first control region 52 between the first control piston 50 and the end wall 46 and further defining a first delivery chamber 54 on the other side thereof.

A first guide shaft 56, axially projecting from the first control piston 50, is fitted within the cylindrical port 48 to provide support and guidance for the first control piston 50. An annular seal 58 prevents fluid leakage past the first guide shaft 56.

A control fluid pressure fitting 60 receives the control fluid pressure from conduit 34. The control fluid pressure is admitted through a port 62 to the first control region 52.

A first pressure inlet 64 receives fluid pressure through conduit 26 from the protected reservoir 16. The first pressure inlet 64 leads to the underside of a first combined exhaust-control valve 66. The first exhaust-control valve 66 comprises a hollow tube 68 arranged to slide axially in a cylindrical opening 70. One end of the hollow tube 68 has a radial outward flange 72 covered with resilient material 74. The resilient material 74 is urged into sealing engagement with an annular inlet valve seat 76 by a spring 78. A seal 80 prevents the leakage of fluid pressure past the hollow tube 68. The second end 82 of the hollow tube 68 opens into a first exhaust port 84.

An axial extension 86 on the face of the first control piston 50 has a coaxial annular valve seat 88. A manual override rod 90 is axially affixed to the axial extension 86. The end 91 of the manual override rod makes axial kissing contact with the second guide shaft 156. The function of the manual override rod will be explained in the section on operation. A first return spring 92 having negligible strength urges first control piston 50 to the right in the figures. A first outlet port 94 connects the first delivery chamber 54 to the conduit 38.

A second assembly, having parts exactly comparable to the assembly just described is located within the second generally cylindrical chamber. Due to their similarity, the parts in the second assembly will not be listed in detail. They have been given reference designators increased by 100 over corresponding parts in the first cylindrical chamber 42.

Annular valve seat 188 is shown having an area greater than that of guide shaft 156. These areas are substracted from the effective areas of the two sides respectively of second control piston 150. Thus unequal pressures are required for balance on the two sides of the second control piston 150. With the area relationships shown, higher pressure is required in the second delivery chamber 154 than in the second control region 152 to achieve a balance on the second control piston 150. The opposite area relationship, in which the control region side of the second control piston 150 may have a smaller effective area than the delivery chamber side may also be utilized for some applications.

A pressure interconnect port 96, shown partly in dashed lines, connects the first delivery chamber 54 with the second control region 152.

Operation of the First Embodiment

In the brakes-off condition shown in FIG. 1, no control fluid pressure is provided in the first control region 52. Consequently, the first control piston 50 is urged rightward by first return spring 92. The annular valve seat 88 is consequently held out of contact with the resilient material 74. Atmospheric pressure air is thus admitted from the first exhaust port 84 through the hollow tube 68 and into the first delivery chamber 54 and thence through first outlet port 94 and conduit 38 to the associated brakes.

Similarly, no air pressure is admitted to the second control region 152. Thus, atmospheric air pressure is admitted to the second delivery chamber 154 through the second hollow tube 168. From the second delivery chamber 154, the atmospheric pressure air is transmitted through second outlet port 194 and conduit 36 to the associated brakes.

The following paragraphs describe the normal operation of the dual relay control valve 28.

When the operator admits control fluid pressure into the dual relay control valve 28 via conduit 34, control fluid pressure fitting 60 and port 62, the control fluid pressure acting across the effective area of the first control piston 50 urges the first control piston 50 leftward in the drawing against the negligible opposing force of first return spring 92. The manual override pushrod 90 forces a corresponding movement on second control piston 150. The annular valve seat 88 makes sealing contact with the resilient material 74 and isolates the first delivery chamber 54 from the first exhaust port 84. The second control piston 150 makes an approximately equal translation against the negligible force of second return spring 192, thus bringing the second annular valve seat 188 into the vicinity of but not in sealing contact with the resilient material 174.

At slightly greater control air pressure in first control region 52, the force exerted by annular valve seat 88 on the resilient material 74 is sufficient to displace the first exhaust-control valve 66 leftward against the negligible force of spring 78 and the fluid pressure in the first pressure inlet 64. The resilient material 74 is thereby moved slightly out of sealing contact with the annular inlet valve seat 76. A metered amount of the fluid pressure in the first pressure inlet 64 is admitted past the annular inlet valve seat 76 and into the first delivery chamber 54 and thence through conduit 38 to the associated brakes.

The fluid pressure in the first delivery chamber 54 is admitted through pressure interconnect port 96 into the second control region 152. The pressure in the second control region 152 acting over the area of the second control piston 150 moves the second guide shaft 156 out of kissing contact with the end 91 and moves the second annular valve seat 188 into sealing contact with the resilient material 174 on the second combined exhaust-control valve 166. Further increases in the fluid pressure in the first delivery chamber 54 cause fluid pressure to be metered into the second delivery chamber 154 in the same manner as described previously.

The fluid pressure in the first delivery chamber 54 also acts over the area of first control piston 50 to generate a force which acts in a direction which opposes the force developed by the control fluid pressure acting on its other side. The fluid pressure in the first delivery chamber increases until it attains a value which generates a force on first control piston 50 which just balances the force generated by the control fluid pressure at its other side. The first control piston 50 is moved rightward until the resilient material 74 is again brought into sealing contact with the annular inlet valve seat 76. As long as the control fluid pressure remains constant, the valve remains in a holding condition in which the fluid pressure in the first delivery chamber 54 remains balanced with the fluid pressure in the first control region 52, and the resilient material 74 remains in sealing contact with both the annular inlet valve seat 76 and the annular valve seat 88. The same activity simultaneously takes place in the second cylindrical region 44 to establish a fluid pressure in the second delivery chamber 154 and then to seal the second delivery chamber 154 against exhaustion or addition of fluid pressure. The difference in effective area on the two sides of the second control piston 150 causes higher pressure to exist in the second delivery chamber 154 than in the first delivery chamber 54. This may advantageously be used to control one set of brakes to a different torque than another set. Thus, it is possible to allow locking of one set of brakes while ensuring that the other set remains rolling. Furthermore, the same differential area effect can be utilized in the first control piston 50. In this case, a failure in the brake system connected to the first delivery chamber 54 can change the relationship between brake controller 32 actuation and braking torque in the brakes connected to the second delivery chamber 154.

Further increases in control fluid pressure in first control region 52 cause the two control pistons 50, 152 to again become displaced to meter additional fluid pressure into their respective delivery chambers 54, 154 until the opposing forces from the delivery chambers 54, 154 balance the forces from the control regions 52, 152.

When the control fluid pressure in the first control region 152 is reduced, as by the operator reducing the pedal deflection or hand controller rotation, or due to relief of the control fluid by a wheel slip control system, the fluid pressure in the first delivery region 54 displaces the first control piston 50 toward the right thereby lifting annular valve seat 88 out of contact with the resilient material 74. The fluid pressure in the first delivery chamber 54, conduit 38 and associated brakes is partially exhausted until equilibrium is again attained.

When the control fluid pressure in the first control region 52 is completely exhausted, the first and second control pistons 50, 150 are urged into the position shown by their return springs 92, 192 thus fully opening the exhaust portions of both combined exhaust-control valves 66, 166.

The following describes the operation of the dual relay control valve when a malfunction in conduit 38 or brakes connected to it keep the fluid pressure in the first delivery chamber 54 near atmospheric pressure.

When control fluid pressure is admitted to the first control region 52, the first control piston 50 is moved leftward until the annular valve seat 88 makes contact with the resilient material 74 and forces the resilient material 74 away from the annular inlet valve seat 76. Fluid is admitted from first pressure inlet 64 to the first delivery chamber 54, however, due to the malfunction, fluid pressure is not developed in the first delivery chamber 54. The opposing force normally developed on the first control piston 50 fails to develop. In addition, the actuating fluid pressure normally connected from the first delivery region 54 to the second control region 152 is not available. Lacking a retarding force on its own face, first control piston 50 continues to be displaced leftward. The manual override rod 90 thus continues to urge the second control piston 150 leftward until its annular valve seat 188 makes sealing contact with the resilient material 174 and further urges the resilient material 174 away from second annular inlet valve 176. Fluid pressure is metered into second delivery chamber 154 until the opposing force developed across the area of the second control piston 150, transmitted rightward through manual override rod 90 to first control piston 50, overcomes the force developed by the control fluid pressure on first control piston 50. The interaction of fluid pressures in second delivery chamber 150 and first control region 52 establishes, increases, maintains and exhausts fluid pressure from the second delivery chamber in a manner completely analogous to that previously described.

The following paragraphs describe the operation of the dual relay control valve 28 when a malfunction in conduit 36 or brakes connected to it keep the fluid pressure in the second delivery chamber 154 near atmospheric pressure.

When fluid pressure developed in the first delivery chamber 54 is connected to the second control region 152, the second control piston 150 moves leftward in the figure. Since the fluid pressure in the second delivery chamber 154 is unable to rise, no opposing force is developed on the second control piston 150. Consequently, the second control piston continues to move leftward until the forward lip 198 of the second control piston 150 comes into abutment with the base wall 199 of the second generally cylindrical chamber 44. Once stopped, the second control piston 150 allows normal fluid pressure to develop in the second control region 152 and consequently normal development and control of the fluid pressure in first delivery chamber 54.

DESCRIPTION OF THE SECOND EMBODIMENT

Figure 3:
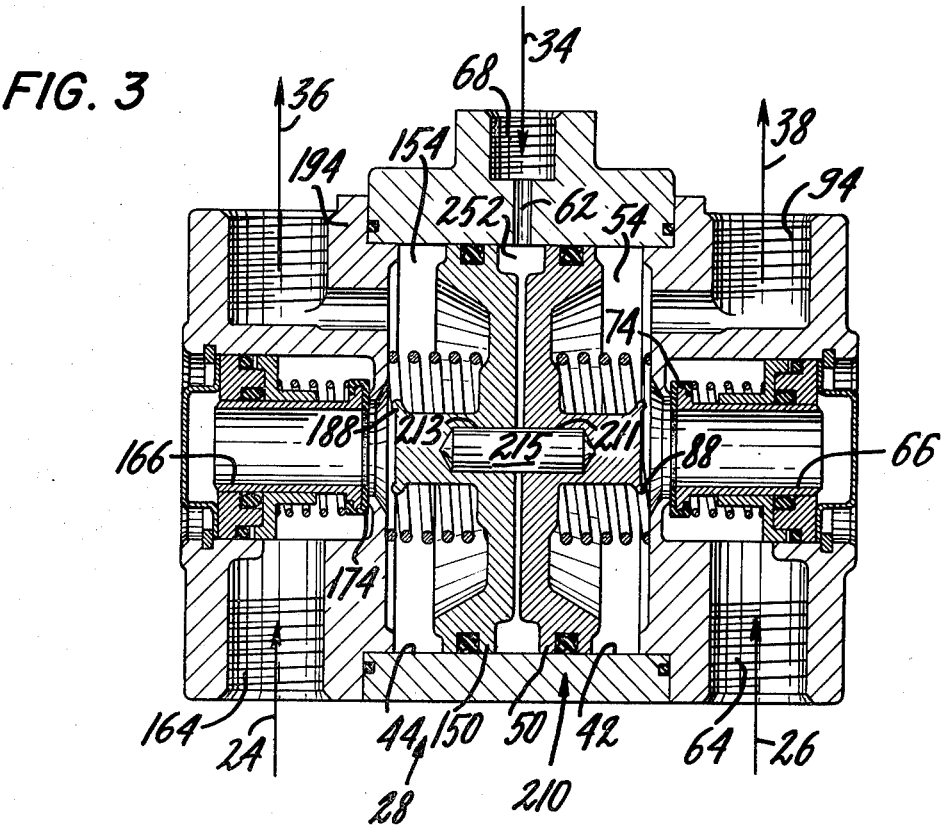
FIG. 3 shows a second embodiment of the invention in longitudinal cross section.

The second embodiment of the dual relay control valve 28 is shown in FIG. 3. Parts which are similar to those in the first embodiment are given the same reference designators. Parts which are unique to the second embodiment are given reference designators in the 200 series. First and second control pistons 50, 150 are placed back to back in a single generally cylindrical region 210. The space between the first and second control pistons 50, 150 comprises a common control region 252. The first control piston 50 and second control piston 150 each have a blind guide hole 211, 213 axially positioned and facing each other. A guide rod 215 is slidingly engaged in the two blind guide holes 211, 213. The engagement between the blind guide holes 211, 213 and the guide rod 215 keeps the two pistons 50, 150 from cocking in the cylindrical region 210 while still allowing them to translate left and right as will be explained.

The control fluid fitting 60 and port 62 are arranged to enter the cylindrical region 210 between the back to back pistons 50, 150 and into the single control region 252. First and second combined exhaust-control valves 66, 166 are as well as annular valve seats 88, 188 on the faces of the first and second control pistons 50, 150.

OPERATION of the Second Embodiment

When control fluid pressure is admitted to the control region 252, it acts simultaneously to urge the first and second pistons 50, 150 outward until their annular valve seats 88, 188 make sealing contact with their resilient material 74, 174 and begin metering fluid pressure into their respective delivery chambers 54, 154. The further operation of the apparatus is as previously described except that both control pistons 50, 150 and valves are simultaneously operated by the same value of control fluid pressure. Consequently, the magnitude of the control fluid pressure at which the two valves begin supplying fluid pressure to conduits 34 and 36 is more nearly equal than in the first embodiment where a first valve must necessarily begin supplying pressure before the second valve be activated.

If a conduit or brake malfunction renders it impossible to develop or maintain fluid pressure in delivery chamber 54 or 154, the control piston 50 or 150 associated with the malfunctioning side is displaced into abutment with the body. The control valve associated with the unfailed side maintains its ability to operate normally.

Description of First and Second Embodiments Having Integral Solenoid Valve

Figure 4:
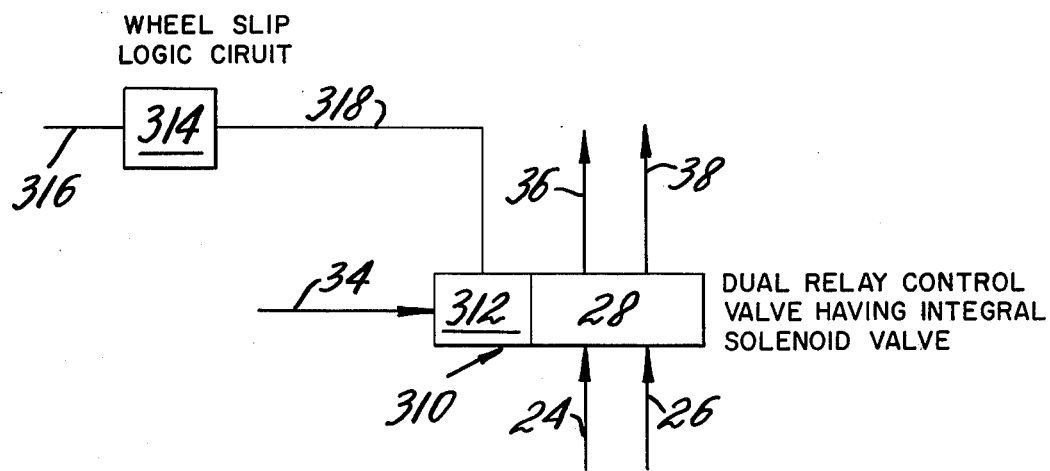
FIG. 4 shows a block diagram of an embodiment of the invention having an integral solenoid modulator valve.

Referring to FIG. 4, a dual relay control valve having an integral solenoid valve shown generally at 310 receives fluid pressure at either the first or second embodiment of a dual relay control valve 28 via conduits 24 and 26, and delivers metered fluid pressure to brake systems (not shown) via conduits 36 and 38 as previously described. An electrically operated solenoid valve 312 is integrally associated with the dual relay solenoid valve 28. Control fluid pressure is connected via conduit 34 to the solenoid valve 312. As will be explained, the control fluid pressure is normally connected through the solenoid valve 312 to the dual relay control valve 28.

An electronic wheel slip logic circuit 314, of a type well known in the art, such as shown and described in U.S. Pat. Nos. 3,833,268 and 3,827,760 and incorporated herein by reference, receives electrical signals which vary with measured vehicle speed on conductor 316. Under certain measured conditions of velocity and/or acceleration, the wheel slip logic circuit 314 generates an electrical signal which is connected to the solenoid valve 312 by the conductor 318. The solenoid valve 312 thereupon momentarily interrupts and/or exhausts the control fluid to the dual relay control valve 28 until the conditions of velocity and/or acceleration measured by the wheel slip logic circuit 314 indicate that the skid is over. The solenoid valve 312 is thereupon deenergized. The velocity and/or acceleration conditions indicating a skid can thereupon recur. In the normal operation of a wheel slip logic circuit 314 during a skid, control signals at the rate of as fast as several per second may be transmitted to the solenoid valve 312. Lengthy pressure hoses between the solenoid valve 312 and the dual relay control valve 28 would add delay times on the order of the desired actuation times and are therefore to be avoided.

Figure 5:
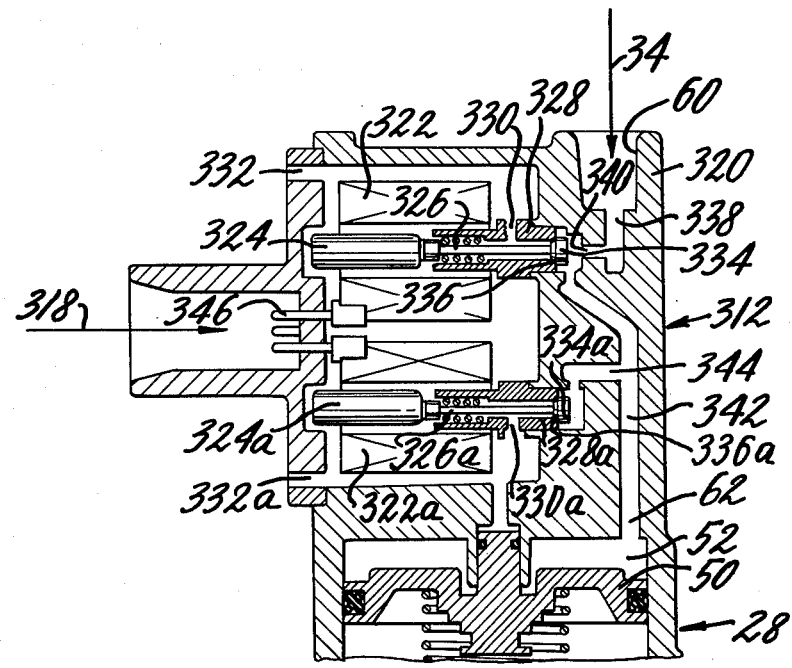
FIG. 5 shows a partial longitudinal cross sectional view of one embodiment of the invention with an integral solenoid modulator valve.

FIG. 5 shows a fractional cross sectional view of the first embodiment of the dual relay control valve 28 having one possible embodiment of a solenoid modulator valve 312 integrally formed with it. The solenoid modulator valve 312 may be of the type disclosed in U.S. Pat. No. 3,881,779 incorporated herein by reference. Other types of solenoid modulator valves may be substituted for the type shown in FIG. 5 without departing from the spirit and scope of the present invention.

The control fluid pressure fitting 60 is located on the body 320 of the solenoid modulator valve 312. First and second solenoids 322, 322a with associated armatures 324, 324a are located within the body 320. First and second shafts 326, 326a, coaxial with the armatures 324, 324a and are spring loaded toward the armatures. The shafts 326, 326a are a loose fit inside concentric tubes 328, 328a thus leaving a concentric flow channel therebetween. Exhaust ports 330, 330a provide free communication between the concentric tubes 328, 328a and exit passages 332, 332a which are open to the atmosphere. The shafts terminate in valves 334, 334a and the concentric tubes 328, 328a terminate in matching valve seats 336, 336a. In the de-energized condition of the solenoids 322, 322a shown, the spring loading on the shafts 326, 326a, draws the valves 334, 334a into sealing contact with the matching valve seats 336, 336a.

An entry channel 338 leads from the control fluid pressure fitting 60 to a valve seat 340 which faces the valve 334. The port 62 to the first control region 52 is connected to a channel 342 which originates at the valve 334 and communicates with the valve 334a through branch channel 344. An electrical connector 346 allows selective energization and de-energization of the two solenoids 322, 322a in any order and combination by signals from the wheel slip logic circuit on conductor 318.

When solenoid 332 is energized, the shaft 326 is driven forward against the spring force by armature 324. Valve 334 is lifted from valve seat 336. Control fluid pressure in channel 342 is enabled to escape past valve 334, along the flow channel within concentric tube 328, through exhaust port 330 and exit passage 332 to the atmosphere. At the same time that the valve 334 moves off its valve seat 336, it continues forward to make sealing contact with valve seat 340. This cuts off the incoming supply of control fluid pressure.

When solenoid 332a is energized in addition to the energization of solenoid 332, the control fluid pressure is vented even more rapidly because of the additional escape path for control fluid pressure. The flow rate through the two valves can be made the same or different depending on the relative aperture sizes chosen in exhaust ports 330, 330a.

When solenoid 332a is energized alone, it may reduce the rate of increase of control fluid pressure in the first control region 50 or it may decrease the control fluid pressure depending on whether it has an exhaust capacity less or greater than the capacity of the entry channel 338.

It would be clear to one skilled in the art that conductor 318 is preferably a plurality of electrical wires insulated from each other.

The integral solenoid modulator valve may also be used with the second embodiment of the invention.

It will be understood that the claims are intended to cover all changes and modifications of the preferred embodiments of the invention, herein chosen for the purpose of illustration which do not constitute departures from the spirit and scope of the invention.

What is claimed is:

1. A dual relay control valve comprising:
    (a) a body;
    (b) a cylindrical cavity within said body;
    (c) first and second control pistons within said cavity;
    (d) means for admitting control fluid pressure between said first and second control pistons whereby they are simultaneously urged apart;
    (e) a first fluid pressure inlet, first outlet port and first exhaust port in said housing;
    (f) first valve means controlling the communication between said first outlet port and said first pressure inlet, and between said first outlet port and said first exhaust port;
    (g) means on said first piston for operating said first valve means in response to said control fluid pressure to establish a first fluid pressure at said first outlet port which is in a predetermined relationship to said control fluid pressure;
    (h) a second fluid pressure inlet, second outlet port and second exhaust port in said housing;
    (i) second valve means controlling the communication between said second outlet port and said second pressure inlet and between said second outlet port and said second exhaust port; and
    (j) means on said second piston for operating said second valve means in response to control fluid pressure to establish a second fluid pressure at said second outlet port which is in a predetermined relationship to said control fluid pressure.

2. The relay control valve recited in claim 1 further comprising an integral solenoid modulator valve in said means for admitting adapted to modifying the control fluid pressure admitted between said first and second control pistons.

3. The relay control valve recited in claim 1 wherein said first fluid pressure is substantially equal to said second fluid pressure.

4. A service brake control system for a towed vehicle whose service brakes are actuated in proportion to variable air pressure from a tractor to which it is connected comprising:
    (a) a manual brake controller in said tractor;
    (b) air pressure supply means for connecting pressurized air to said manual brake controller;
    (c) an air only actuated dual relay control valve in said towed vehicle having first and second air pressure inlets, a control air pressure inlet and first and second air pressure outlets;
    (d) said manual brake controller being effective to meter varying air pressure to its outlet in proportion to a manual input;

(e) first air pressure connection means for connecting the varying air pressure from said manual brake controller to said control air pressure inlet;

(f) first and second check valves in said towed vehicle;

(g) first and second reservoirs connected respectively to said first and second check valves;

(h) first means for connecting said first reservoir to said first air pressure inlet;

(i) second means for connecting said second reservoir to said second air pressure inlet;

(j) second air pressure connection means for connecting said air pressure supply means to said first and second check valves;

(k) first and second service brake conduits connected respectively to said first and second air pressure outlets;

(l) said dual relay control valve comprising:
  (i) a body;
  (ii) at least first and second pistons sealably enclosed and moveable within said body;
  (iii) said varying air pressure being connected at least to one side of the first control piston;
  (iv) means actuated by said varying air pressure for connecting and varying the air pressure from said first air pressure inlet to said first air pressure outlet in proportion to movement of said first control piston;
  (v) means for connecting a variable air pressure which varies substantially in proportion to said varying air to one side of said second control piston;
  (vi) means actuated by said variable air pressure for connecting and varying the air pressure from said second air pressure inlet to said second air pressure outlet in proportion to said variable air pressure; and
  (vii) mechanical means for actuating said second control piston by said first control piston in case of failure of said variable air pressure;

(m) wheel slip logic means actuated by predetermined measured conditions for generating at least a first electrical signal; and (n) solenoid valve means integrally contained in said body in said control air pressure inlet actuated in response to said at least a first electrical signal for isolating said control air pressure inlet and for venting air pressure at a controlled rate from said body.

5. A service brake control system as recited in claim 4 further comprising:

(a) said wheel slip logic means generating at least first and second electrical signals; and (b) second solenoid valve means integrally contained in said body in said control air pressure inlet actuated in response to said second electrical signal for venting air pressure at a second controlled rate from said body.

6. A service brake control system for a towed vehicle whose service brakes are actuated in proportion to variable air pressure from a tractor to which it is connected comprising:

(a) a manual brake controller in said tractor;

(b) air pressure supply means for connecting pressurized air to said manual brake controller;

(c) an air only actuated dual relay control valve in said towed vehicle having first and second air pressure inlets, a control air pressure inlet and first and second air pressure outlets;

(d) said manual brake controller being effective to meter varying air pressure to its outlet in proportion to a manual input;

(e) first air pressure connection means for connecting the varying air pressure from said manual brake controller to said control air pressure inlet;

(f) first and second check valves in said towed vehicle;

(g) first and second reservoirs connected respectively to said first and second check valves;

(h) first means for connecting said first reservoir to said first air pressure inlet;

(i) second means for connecting said second reservoir to said second air pressure inlet;

(j) second air pressure connection means for connecting said air pressure supply means to said first and second check valves;

(k) first and second service brake conduits connected respectively to said first and second air pressure outlets; and (l) said dual relay control valve comprising:
  (i) a body;
  (ii) at least first and second pistons sealably enclosed and moveable within said body;
  (iii) said varying air pressure being connected at least to one side of the first control piston;
  (iv) means actuated by said varying air pressure for connecting and varying the air pressure from said first air pressure inlet to said first air pressure outlet in proportion to movement of said first control piston;
  (v) means for connecting a variable air pressure which varies substantially in proportion to said varying air to one side of said second control piston;
  (vi) means actuated by said variable air pressure for connecting and varying the air pressure from said second air pressure inlet to said second air pressure outlet in proportion to said variable air pressure; and
  (vii) mechanical means for actuating said second control piston by said first control piston in case of failure of said variable air pressure.

* * * * *